(12) United States Patent
Tanaka et al.

(10) Patent No.: US 11,146,693 B2
(45) Date of Patent: Oct. 12, 2021

(54) IMAGE PROCESSING APPARATUS AND FOLDING DEVICE

(71) Applicant: FUJIFILM BUSINESS INNOVATION CORP., Tokyo (JP)

(72) Inventors: Shogo Tanaka, Kanagawa (JP); Kenji Sawai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/930,759

(22) Filed: Jul. 16, 2020

(65) Prior Publication Data

US 2021/0289077 A1    Sep. 16, 2021

(30) Foreign Application Priority Data

Mar. 16, 2020 (JP) .............................. JP2020-045037

(51) Int. Cl.
*G06K 15/00* (2006.01)
*H04N 1/00* (2006.01)

(52) U.S. Cl.
CPC ..... *H04N 1/00037* (2013.01); *H04N 1/00005* (2013.01); *H04N 1/00045* (2013.01); *H04N 1/00639* (2013.01)

(58) Field of Classification Search
CPC .......... H04N 1/00037; H04N 1/00005; H04N 1/00045; H04N 1/00639
See application file for complete search history.

(56) References Cited

U.S. PATENT DOCUMENTS

| | | |
|---|---|---|
| 2012/0071310 A1 | 3/2012 | Satoh |
| 2016/0191734 A1* | 6/2016 | Yu ........................ H04N 1/3878 358/450 |
| 2018/0359383 A1 | 12/2018 | Tada |
| 2019/0070885 A1* | 3/2019 | Tanigawa ............... B65H 37/06 |

FOREIGN PATENT DOCUMENTS

| | | |
|---|---|---|
| JP | 2012-066884 A | 4/2012 |
| JP | 2018-207398 A | 12/2018 |

* cited by examiner

*Primary Examiner* — Moustapha Diaby
(74) *Attorney, Agent, or Firm* — Oliff PLC

(57) ABSTRACT

An image processing apparatus includes a processor configured to: acquire image information obtained by reading a folded sheet with an image reading device in a state where the folded sheet is unfolded; acquire first and second distances in the image information, the first and second distances being distances from first and second positions to a predetermined reference of the sheet, respectively, the first and second positions on a folding line of the sheet being separated by a predetermined distance; and detect an inclination of the folding line of the sheet based on the first and second distances.

20 Claims, 11 Drawing Sheets

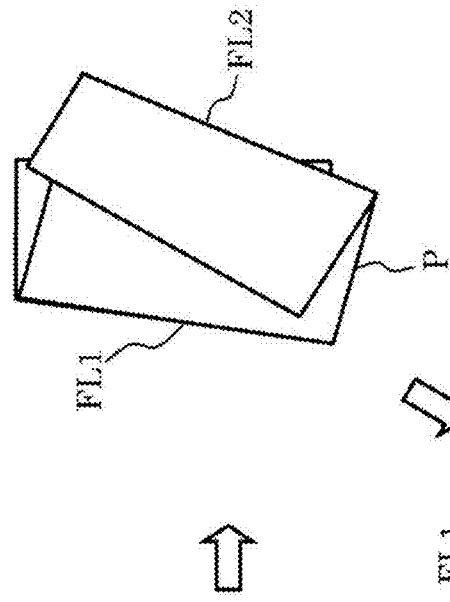
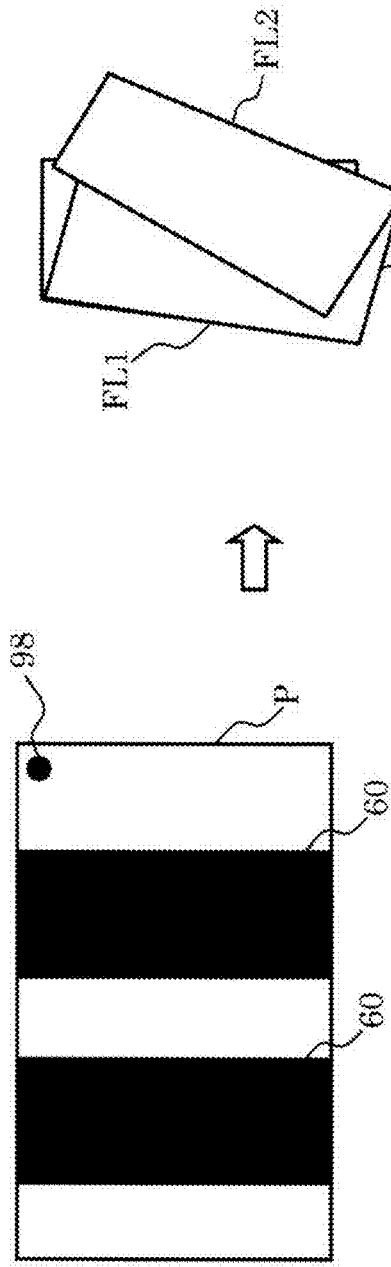
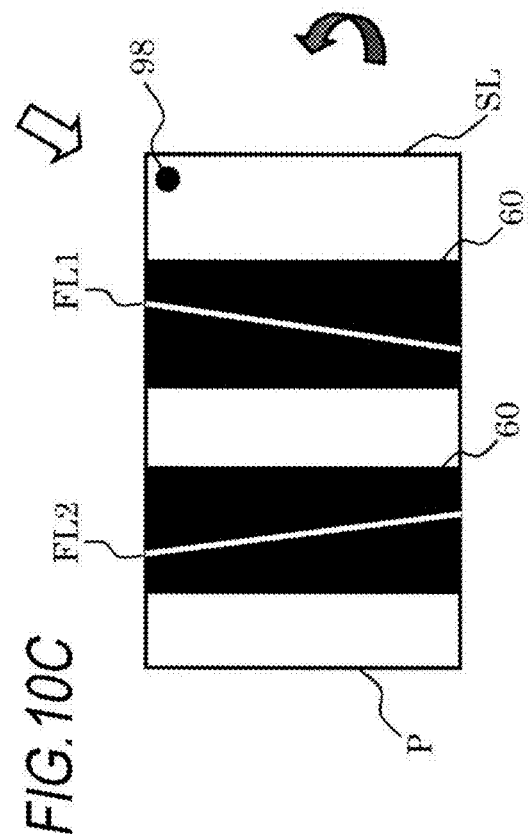

IMAGE PROCESSING APPARATUS AND FOLDING DEVICE

This application is based on and claims priority under 35 USC 119 from Japanese Patent Application No. 2020-045037 filed Mar. 16, 2020.

BACKGROUND

1. Technical Field

The present disclosure relates to an image processing apparatus and a folding device.

2. Related Art

Automatic folding devices (hereinafter, simply referred to as folding devices) perform a folding process for a sheet. Whether a position of a folding line of the folded sheet is deviated from a desired position is also verified. For example, the position of the folding line can be detected and confirmed by reading the folded sheet with an image reading device.

JP-A-2018-207398 discloses an image reading device including a light receiver, a first light emitting unit, and a second light emitting unit. The light receiver receives reflected light from a document that is folded and then opened to obtain an image. The first light emitting unit and the second light emitting unit are respectively disposed upstream and downstream of the light receiver in a document reading direction with the light receiver interposed between the first light emitting unit and the second light emitting unit. A position of a fold of the document is specified by comparing a first image obtained by reading the document in a state where light is emitted from only the first light emitting unit with a second image obtained by reading the document in a state where light is emitted from only the second light emitting unit.

JP-A-2012-066884 discloses a sheet folding device that includes a leading end stopper that abuts against the leading end of a sheet to determine a folding position, and adjusts an angle of the leading end stopper.

SUMMARY

The folding line of the sheet may be formed to be inclined with respect to a desired extending direction, and thus, a desired folding result may not be obtained. Therefore, there is a desire to detect an inclination of a folding line of a sheet.

Aspects of non-limiting embodiments of the present disclosure relate to detecting an inclination of a folding line of a sheet with respect to a desired extending direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: acquire image information obtained by reading a folded sheet with an image reading device in a state where the folded sheet is unfolded; acquire first and second distances in the image information, the first and second distances being distances from first and second positions to a predetermined reference of the sheet, respectively, the first and second positions on a folding line of the sheet being separated by a predetermined distance; and detect an inclination of the folding line of the sheet based on the first and second distances.

BRIEF DESCRIPTION OF THE DRAWINGS

Exemplary embodiment(s) of the present disclosure will be described in detail based on the following figures, wherein:

FIGS. 10A to 10C are views illustrating a process of preparing a test sheet for detecting the inclination of each folding line of a Z-folded sheet.

DETAILED DESCRIPTION

Figure 1:
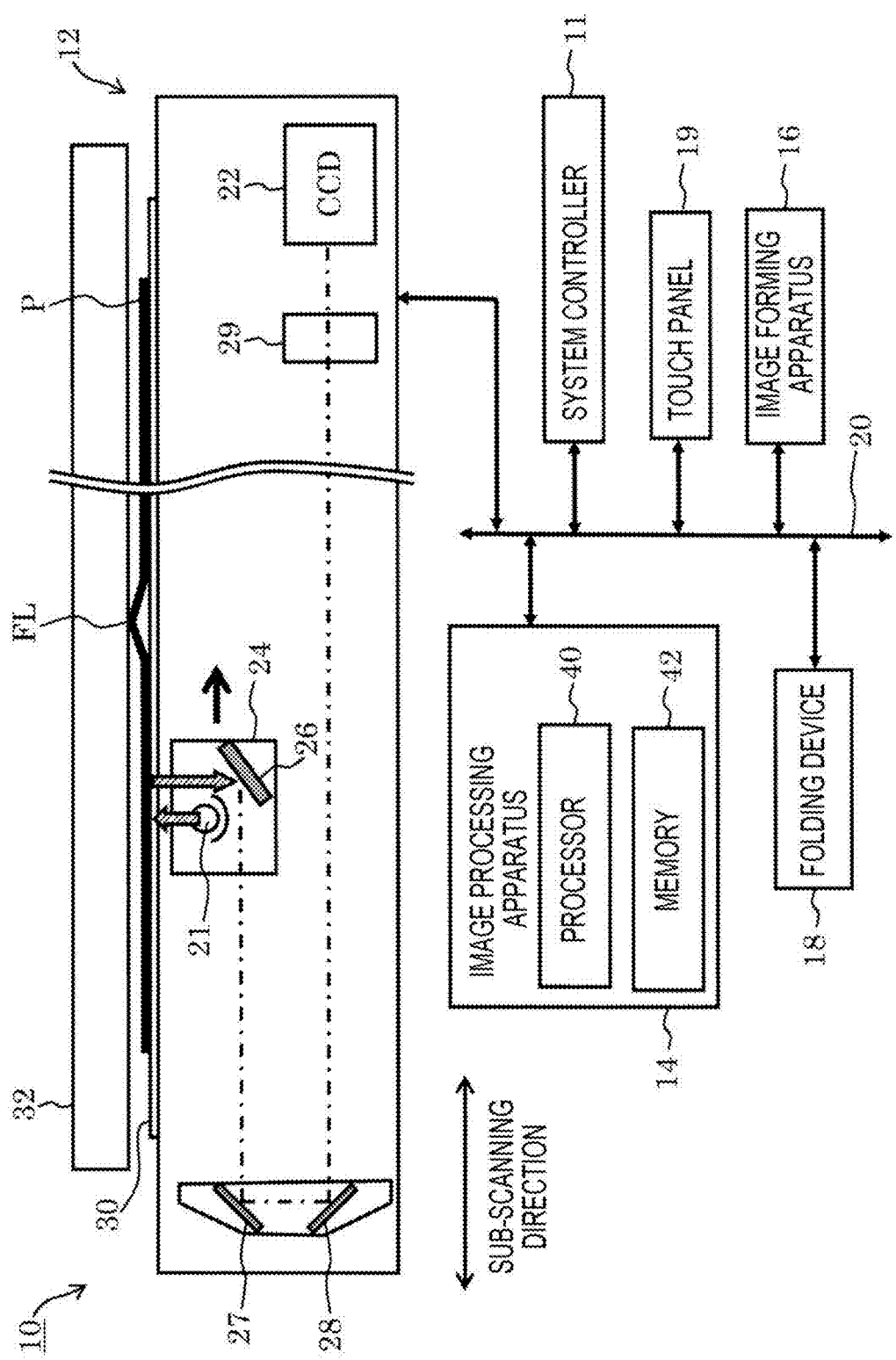
FIG. 1 is a block configuration diagram of a system in each exemplary embodiment of the present disclosure.

Hereinafter, exemplary embodiments of the present disclosure will be described in detail with reference to the accompanying drawings. The configuration described below is an example for description, and can be appropriately changed in accordance with the specification of the device or the like. When the following description contains plural exemplary embodiments and plural modifications, it is assumed from the beginning that characteristic parts of the exemplary embodiments and the modifications may be used in combination as appropriate. In all the drawings, the same elements are denoted by the same reference numerals, and repetitive descriptions thereof will be omitted.

FIG. 1 is a block configuration diagram of a system 10 according to each exemplary embodiment of the present disclosure. The system 10 includes a system controller 11, an image reading device 12, an image processing apparatus 14, an image forming apparatus 16, a folding device 18, and a touch panel 19, which are electrically connected to each other via a bus 20. The system 10 is placed in, for example, a printing company, an office or the like, and is connected to a network such as a LAN. In the system 10, the system controller 11 receives a job from the outside via the network or receives an operator's instruction input to the touch panel 19 to provide a print function, a copy function, a sheet folding function, and the like. The system 10 has a great feature in that it includes a function of detecting an inclination of a folding line of a sheet P folded by the folding device 18 and adjusting the folding device 18 based on the detected inclination of the folding line.

The system controller 11 includes a processor (not illustrated) and a memory (not illustrated) and controls the entire system 10. The system controller 11 controls the image reading device 12, the image processing apparatus 14, the image forming apparatus 16, and the folding device 18 according to a job input from the outside, an instruction input from the operator via the touch panel 19, and the like. A processor 40 of the image processing apparatus 14 may perform this control.

While various forms may be adopted as the image reading device 12, FIG. 1 illustrates a device configuration which is merely an example. The image reading device 12 includes a platen glass 30 on which a sheet is placed. When detecting an inclination of a folding line of a folded sheet P, the folded sheet P is placed on the platen glass 30 in an unfolded state as illustrated in FIG. 1.

The image reading device 12 also includes a platen cover 32 that presses the sheet P onto the platen glass 30, an illumination unit 21 that illuminates the sheet P placed on the platen glass 30, and a light receiver 22 which is a CCD (Charge Coupled Device) that receives reflected light from the sheet P. The illumination unit 21 is mounted on a carriage 24 that moves in the sub-scanning direction (left and right direction in FIG. 1), and scans the sheet P as the carriage 24 moves, and the reflected light from the sheet P is guided to the light receiver 22 via a mirror 26 mounted on the carriage 24, fixed mirrors 27 and 28, and a lens 29. The light receiver 22 converts the reflected light into an electric signal to generate image information.

The image processing apparatus 14 includes the processor 40 and a memory 42. When detecting the inclination of the folding line of the sheet P, the processor 40 operates according to a program stored in the memory 42, acquires the image information on the sheet P from the image reading device 12, and temporarily stores the acquired image information in the memory 42. Then, the processor 40 appropriately reads and analyzes the image information from the memory 42 to detect the inclination of the folding line of the sheet P. The memory 42 is, for example, a memory implemented by a semiconductor element (for example, a RAM, a flash memory or the like), a hard disk or the like, and stores programs, image information and others.

The image forming apparatus 16 is an apparatus that forms an image on the sheet P by an electrophotographic method, an inkjet recording method or the like. The folding device 18 is a device that performs a folding process such as a half-fold, a Z-fold (an accordion fold), and a C-fold (a tri-fold). The image forming apparatus 16 and the folding device 18 are connected to each other through a sheet transport path such that the image forming apparatus 16 transports the sheet to the folding device 18, with or without the image forming apparatus 16 forming an image on the sheet, to perform a folding process on the sheet.

Next, the process of detecting the inclination of the folding line of the sheet P will be described in detail. There are a first exemplary embodiment for detecting the inclination of the folding line with respect to one side of the sheet, and a second exemplary embodiment for detecting the inclination of the folding line with respect to the image formed on the sheet. First, the first exemplary embodiment will be described.

First Exemplary Embodiment

Figure 2:
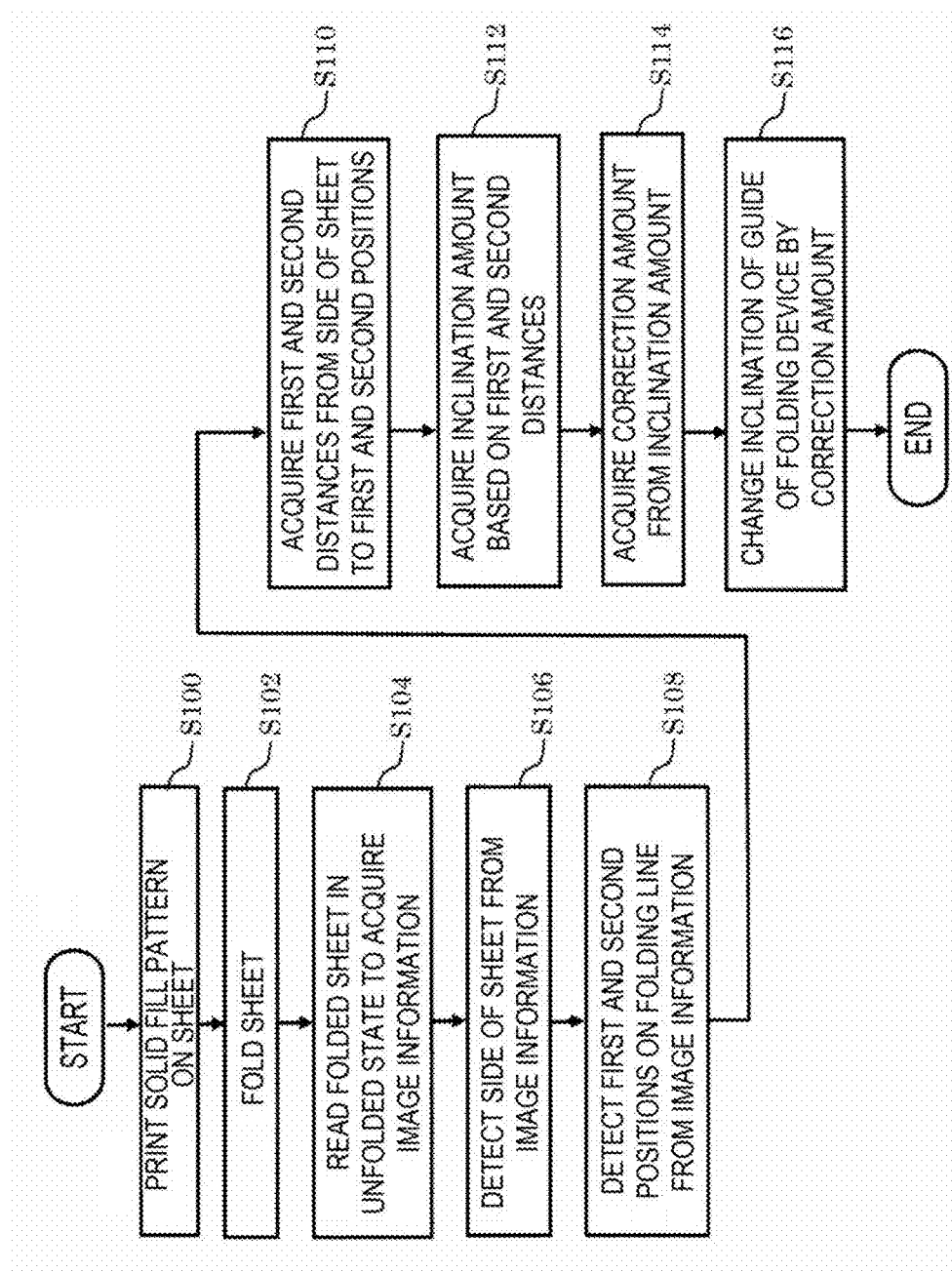
FIG. 2 is a flowchart of a process of detecting an inclination of a folding line of a sheet in a first exemplary embodiment.

FIG. 2 is a flowchart of a process detecting an inclination of a folding line and adjusting the folding device 18 based on the detected inclination of the folding line according to the first exemplary embodiment. The flow of FIG. 2 is started when an operator operates the touch panel 19 to issue an instruction to start adjusting the folding device 18 (which may be referred to as an "adjustment start instruction").

First, S100 and S102 in FIG. 2 are steps of preparing a test sheet P (also simply referred to as a sheet P) for detecting the inclination of the folding line. When the adjustment start instruction is issued through the touch panel 19, the system controller 11 receives the instruction, causes the image forming apparatus 16 to form a solid fill pattern on the sheet P (S100), and then, issues a command to fold the sheet P to the folding device 18 (S102).

Figure 3A:
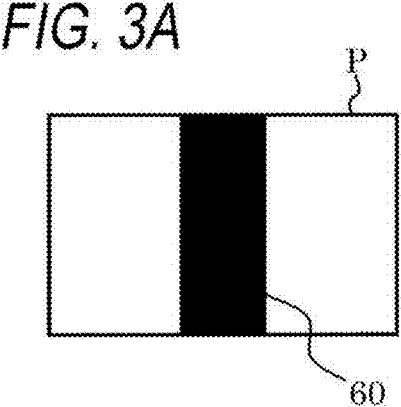
FIGS. 3A to 3C are views illustrating a process of preparing a test sheet in the first exemplary embodiment.
Figure 3B:
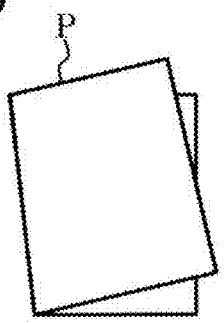
Figure 3C:
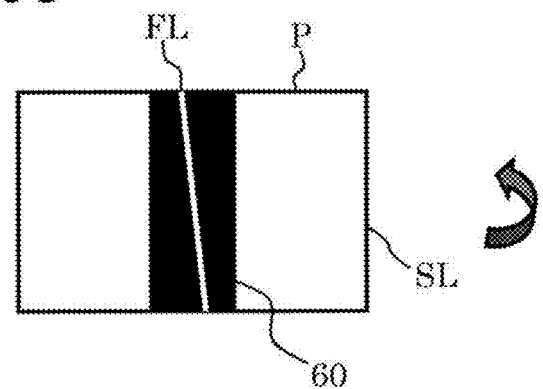

FIGS. 3A to 3C illustrate a process of preparing the test sheet P. In response to a command from the system controller 11, the image forming apparatus 16 feeds a sheet P from a sheet feed tray (not illustrated) and forms a solid fill pattern 60 on the sheet P (S100). FIG. 3A illustrates an example of the sheet P formed with the solid fill pattern 60. As illustrated in FIG. 3A, the solid fill pattern 60 is a black solid fill image formed in a predetermined region including a portion where the folding line of the sheet P before being folded is formed. The solid fill pattern 60 may be formed in a color other than black.

The sheet P on which the solid fill pattern 60 is formed is sent to the folding device 18 through the sheet transport path. The folding device 18 half-folds the sent sheet P (S102), and then, discharges the folded sheet P to an external sheet discharge tray (not illustrated). FIG. 3B illustrates an example of the sheet P folded by the folding device 18. The sheet P illustrated in FIG. 3B has a folding line with an inclination.

When the folded sheet P is discharged, the folding device 18 notifies the system controller 11 of the completion of the discharge via the bus 20. When the notification is received from the folding device 18, the system controller 11 displays on the touch panel 19 that the preparation of the test sheet P has been completed. Thus, the preparation of the test sheet P is completed. The system controller 11 also displays a guide screen on the touch panel 19. The guide screen is a screen requesting an operator to input an instruction to continue the adjustment (which may referred to as an "adjustment continue instruction") through the touch panel 19 when he or she unfolds and places the discharged and folded sheet P on the platen glass 30 of the image reading device 12 and the sheet P is ready to be read.

FIG. 3C illustrates the discharged and folded sheet P (the sheet P illustrated in FIG. 3B), which is spread (unfolded). Colorant such as toner or ink adheres to a portion of the solid fill pattern 60 on the sheet P, and when the sheet P is folded, a portion of the colorant is peeled off at a portion of a folding line FL, and thus, the folding line FL becomes conspicuous as illustrated in FIG. 3C. As a result, the folding line FL easily appears in the image information obtained by reading the sheet P with the image reading device 12.

The operator unfolds the discharged and folded sheet P according to the guide screen of the touch panel 19 and places the unfolded sheet on the platen glass 30 of the image reading device 12. At this time, the operator causes the side of the sheet P on which the solid fill pattern 60 is formed to face the platen glass 30. As a result, the sheet P illustrated in FIG. 3C is turned upside down, and one side SL of the sheet P faces the left side on the platen glass 30. Further, the operator places the sheet P away from the edge of the platen glass 30 in order to express a contour line of the sheet P in the image information obtained by reading the sheet P. The details of the placing method may be displayed on the touch panel 19 to guide the operator. Then, as illustrated in FIG. 1, the operator covers the sheet P with the platen cover 32 from above the sheet P, and then, operates the touch panel 19 to issue an instruction to continue the adjustment.

In FIG. 1, the sheet P is placed such that the folded back of the sheet P touches the platen cover 32. Alternatively, the sheet P may be turned upside down such that the folded back of the sheet P touches the platen glass 30. In this case, the solid fill pattern 60 needs to be formed on the outer surface of the folded sheet P (the sheet P in the state of FIG. 3B).

When the adjustment continuation instruction is received from the operator via the touch panel 19, the system controller 11 issues a command to the image reading device 12 to acquire image information. In response to the command from the system controller 11, the image reading device 12 moves the carriage 24 in the sub-scanning direction to scan the sheet P, and acquires image information on the sheet P (S104 in FIG. 2). When the image information is acquired, the image reading device 12 notifies the system controller 11 of the acquisition completion via the bus 20. Upon receiving the notification, the system controller 11 issues to the image processing apparatus 14 a command to detect the inclination of the folding line of the sheet based on the image information.

Upon receiving the command from the system controller 11, the processor 40 of the image processing apparatus 14 first acquires the image information from the image reading device 12 and stores the acquired image information in the memory 42. Then, the processor 40 reads and analyzes the image information from the memory 42 to detect the inclination of the folding line FL of the sheet P. S106 to S112 in FIG. 2 are the specific detection process performed by the processor 40 of the image processing apparatus 14. Hereinafter, the process of detecting the inclination of the folding line FL, which is performed by the processor 40, will be described.

Figure 4:
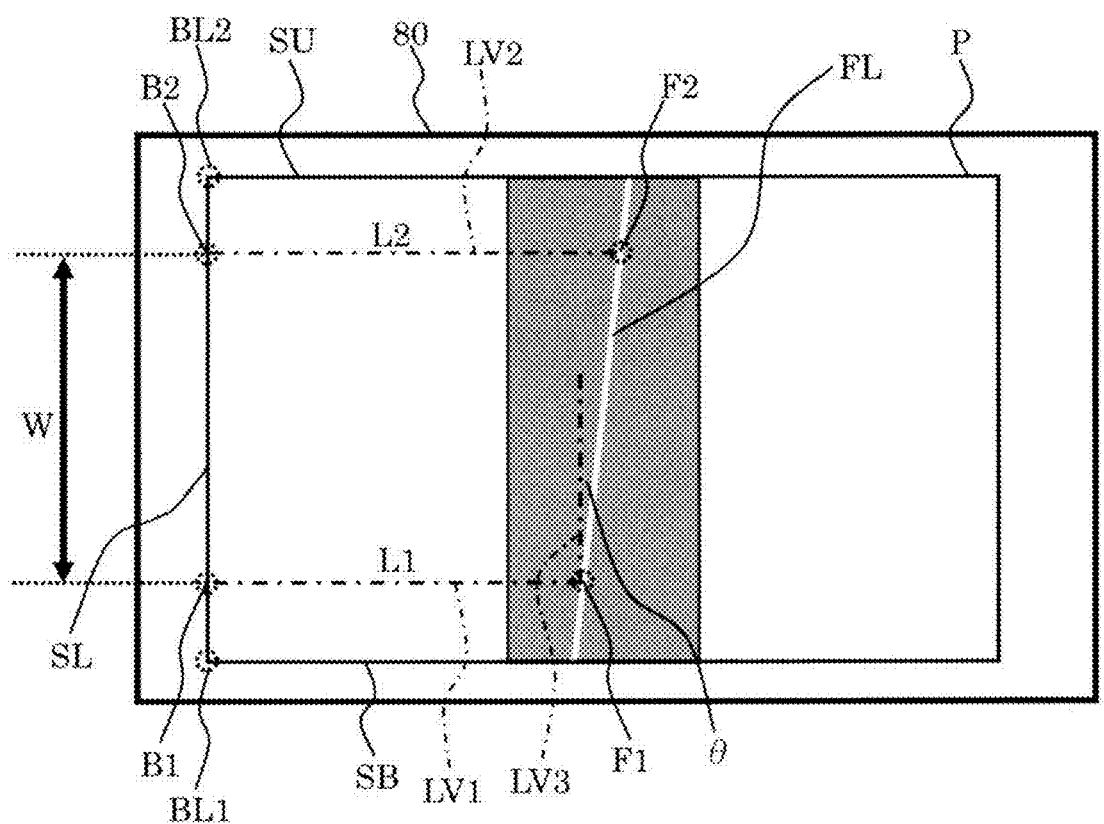
FIG. 4 is a view illustrating an example of image information in the first exemplary embodiment.

First, in S106, the processor 40 detects one side SL of the sheet in the image information. FIG. 4 is a view illustrating image information 80 obtained by reading the sheet P illustrated in FIG. 3C with the image reading device 12. Since the sheet P is read apart from the edge of the platen glass 30, the image information 80 represents a contour line of each side of the sheet P (SL, SU, SB, etc. illustrated in FIG. 4). In this detection process, in the image information 80, the inclination of the folding line FL with respect to the left side SL of the sheet P (hereinafter, also referred to as the reference side SL) is detected. The processor 40 searches the image information 80 to detect the reference side SL of the sheet P. Then, after detecting the reference side SL, the processor 40 specifies a first reference position B1 and a second reference position B2 on the reference side SL which are inside by a predetermined length from a first end BL1 and a second end BL2 of the reference side.

Next, in S108, the processor 40 specifies a first position F1 and a second position F2 on the folding line FL in the image information 80. The processor 40 specifies, as the first position F1, a position where the folding line FL intersects a virtual line LV1 extending from the first reference position B1 in the vertical direction with respect to the reference side SL. Further, the processor 40 specifies, as the second position F2, a position where the folding line FL intersects a virtual line LV2 extending from the second reference position B2 in the vertical direction with respect to the reference side SL.

Next, in S110, the processor 40 acquires a first distance L1 that is a distance from the first reference position B1 to the first position F1 and a second distance L2 that is a distance from the second reference position B2 to the second position F2 in the image information 80.

Then, in S112, the processor 40 detects the inclination of the folding line FL with respect to the reference side SL based on the first distance L1 and the second distance L2. In FIG. 4, a virtual line LV3 parallel to the reference side SL is drawn in contact with the folding line FL. When the first distance L1 is equal to the second distance L2, the processor 40 detects that the folding line FL is not inclined with respect to the reference side SL. When the first distance L1 is smaller than the second distance L2 (the case illustrated in FIG. 4), the processor 40 detects that the folding line FL is inclined clockwise with respect to the reference side SL. When the first distance L1 is larger than the second distance L2, the processor 40 detects that the folding line FL is inclined counterclockwise with respect to the reference side SL. In the present specification, the "inclination of the folding line" refers to information indicating whether the folding line has an inclination and whether the folding line inclines clockwise or counterclockwise with respect to the reference. In addition, in the present specification, the "inclination amount of the folding line" refers to information including the magnitude of the inclination of the folding line in addition to the information on the "inclination of the folding line".

In this exemplary embodiment, the processor 40 also acquires the inclination amount of the folding line FL. The processor 40 further acquires a distance W between the first reference position B1 and the second reference position B2 in the image information 80. Then, the processor 40 calculates the inclination amount RG according to the following equation (1). The calculated inclination amount RG is stored in the memory 42.

$$RG=(L2-L1)/W \qquad (1)$$

The processor 40 may acquire an angle θ calculated according to the following equation (2), as the inclination amount.

$$\theta=\tan^{-1}(RG) \qquad (2)$$

The above is the inclination detection process of the folding line FL according to the first exemplary embodiment. Next, in S114, the processor 40 acquires a correction amount C of the folding device 18 from the inclination amount RG (or θ) of the folding line FL. This is to acquire a numerical value obtained by reversing the positive/negative of the inclination amount RG (or θ), as the correction amount C. When the folding line FL is inclined clockwise with respect to the reference side SL, the inclination amount RG (or θ) has a positive value. When the folding line FL is inclined counterclockwise with respect to the reference side SL, the inclination amount RG (or θ) has a negative value. That is, whether the positive/negative of the inclination amount RG represents an inclination direction. Like the inclination amount RG, the correction amount C represents a direction in which the folding line FL is corrected depending on whether the value is positive or negative, and represents an amount of the correction based on the absolute of the value. For example, in a case where the folding line FL is inclined clockwise by a degrees with respect to the reference side SL (the inclination amount θ=+α), when the folding line FL is corrected to be inclined counterclockwise by a degrees, since the folding line FL is parallel to the reference side SL, the processor 40 acquires the correction amount C=−α which is a numerical value obtained by inverting the positive/negative of the inclination amount θ. Similarly, for example, when the folding line FL is inclined counterclockwise by a degrees with respect to the reference side SL (the inclination amount θ=−α), if the folding line FL is corrected to be inclined clockwise by a degrees, since the folding line FL is parallel to the reference side SL, the processor 40 acquires the correction amount C=+α which is a numerical value obtained by inverting the positive/negative of the inclination amount θ. The acquired correction amount C is stored in the memory 42.

When the process of S114 in FIG. 2 is completed, the image processing apparatus 14 notifies the system controller 11 of the detection completion via the bus 20. Upon receiving the notification, the system controller 11 issues a command to correct the inclination of the folding line FL, to the folding device 18.

Upon receiving the command from the system controller 11, the folding device 18 acquires the correction amount C stored in the memory 42 of the image processing apparatus 14, and corrects an inclination of a guide that determines a folding position of the sheet, based on the correction amount C (S116 in FIG. 2). When the correction is completed, the folding device 18 notifies the system controller 11 of the correction completion via the bus 20. Then, in response to the notification, the system controller 11 displays on the touch panel 19 that the adjustment of the folding device 18 is completed. This allows the operator to know the end of the adjustment of the folding device 18.

According to the first exemplary embodiment described above, since the inclination amount RG (or θ) of the folding line FL with respect to one side SL of the sheet is detected and the inclination of the guide of the folding device 18 is corrected based on the correction amount C corresponding to the inclination amount, when another sheet is folded by the folding device 18 after the correction, the folding line FL of the other sheet may be expected to be parallel to or be close parallel to one side SL of the sheet.

Figure 11:
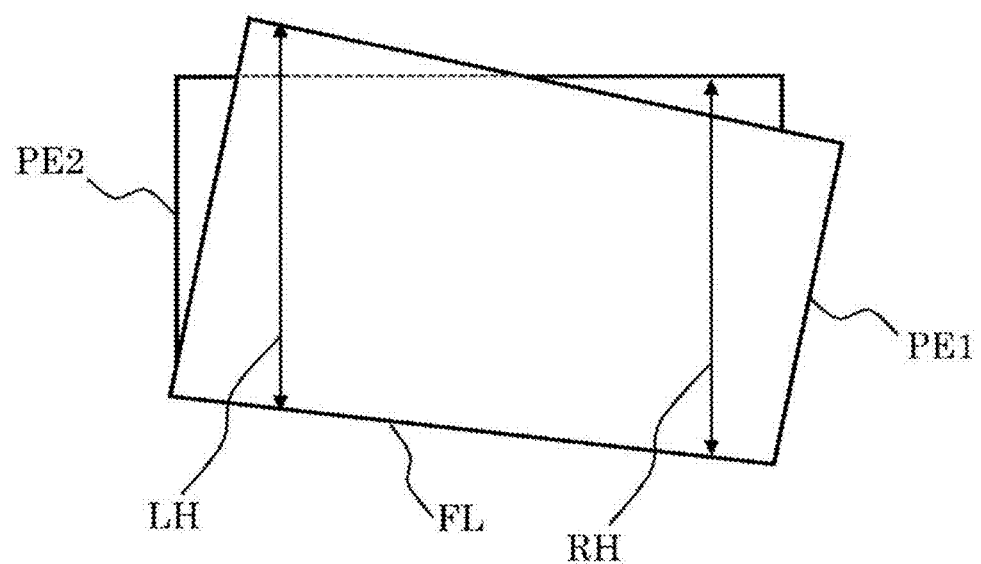
FIG. 11 is a view illustrating the related art.

JP-A-2012-066884 discloses a sheet folding device including folding length measuring units such as two light reflective sensors or the like in the middle of a transport path of a folded sheet. While the folded sheet is transported in the transport direction, which is a direction intersecting the folding line, as the two folding length measuring units detect the leading end and the trailing end of the sheet, respectively, the sheet length of each of the left and right sides of the sheet in a direction perpendicular to the transport direction of the sheet is measured and an angle of the leading end stopper that determines the folding position of the sheet is adjusted based on a difference between the two measured sheet lengths. The difference between the two sheet lengths represents the size of the inclination of the folding line of the folded sheet. Here, in the configuration disclosed in JP-A-2012-066884, for example, in case where two edges (hereinafter, referred to as small edges) on the side opposite to the folded back of the sheet overlap or are close to each other, as in half-folding illustrated in FIG. 11, when each of the two folding length measuring units detects the leading end or the trailing end of the sheet depending on the inclination of the folding line FL, a small edge of PE1 on one side of the folded piece of the sheet may be detected in the left side of the sheet (see reference numeral LH in FIG. 11) and a small edge of PE2 on the other side of the folded piece of the sheet may be detected in the right side of the sheet (see reference numeral RH in FIG. 11). As a result, the inclination of the folding line FL of the sheet may not be detected correctly. Meanwhile, according to the first exemplary embodiment of the present disclosure described above, even in case where two small edges on the side opposite to the folded back of the sheet overlap or are close to each other, it is possible to correctly detect the inclination of the folding line FL.

In the above-described first exemplary embodiment, the correction of the folding device 18 is automatically performed, but the inclination amount of the folding line FL of the sheet P may be displayed on the touch panel 19 without performing the correction of the folding device 18. In this case as well, the operator may grasp the correction amount of the folding device 18 for obtaining the folding line FL parallel to the one side SL of the sheet. Further, the inclination of the folding line FL of the sheet P (the information about the presence or absence of the inclination and the inclination direction) may be displayed on the touch panel 19. In this case as well, the operator may know whether the correction of the folding device 18 is necessary to obtain the folding line FL parallel to the one side SL of the sheet.

In the first exemplary embodiment described above, the folding device 18 is to acquire the correction amount C from the image processing apparatus 14 and correct the inclination of the guide of the folding device 18 by the correction amount C. Alternatively, the folding device 18 may acquire the inclination of the folding line FL (the information about the presence/absence of the inclination and the inclination direction (clockwise or counterclockwise)) or the correction information corresponding thereto (whether correction is necessary and the correction direction (direction opposite to the inclination direction)) from the image processing apparatus 14, and correct the inclination of the guide in the correction direction by a predetermined amount. In this case as well, the inclination of the folding line FL is improved when another sheet is folded by the folding device 18.

Further, in the first exemplary embodiment described above, the solid fill pattern 60 is formed at a position where the sheet P is folded. In a case where the folding line FL may be grasped in the image information 80 without the solid fill pattern 60, the solid fill pattern 60 may not be formed on the sheet P.

Further, in the first exemplary embodiment described above, as illustrated in FIG. 4, the positions on the reference side SL that is inside by a predetermined length from the first end BL1 and the second end BL2 of the reference side SL are set as the first reference position B1 and the second reference position B2, respectively. Alternatively, the first end BL1 and the second end BL2 of the reference side SL may be set as the first reference position B1 and the second reference position B2, respectively. In this case, the first position F1 on the folding line FL is located on the lower side SB of the sheet, and the second position F2 is located on the upper side SU of the sheet. The first distance L1 is the distance from the first position F1 on the lower side SB of the sheet (the sheet end on the side of the first position F1) to the first reference position B1 (the same as BL1), and the second distance L2 is the distance from the second position F2 on the upper side SU of the sheet (the sheet end on the side of the second position F2) to the second reference position B2 (the same as BL2). In this way, since a difference between the first distance L1 and the second distance L2 is greater than when the first position F1 and the second position F2 are not at the sides SB and SU (as illustrated in FIG. 4), an error of the inclination amount RG calculated from the difference between L1 and L2 may be made smaller. That is, it is possible to obtain a more accurate inclination amount RG of the folding line FL.

Second Exemplary Embodiment

Next, detection of an inclination of a folding line according to a second exemplary embodiment will be described.

This exemplary embodiment involves detection of an inclination of a folding line with respect to an image formed on the sheet. Since the second exemplary embodiment has many points in common with the first exemplary embodiment, points different from the first exemplary embodiment will be particularly described.

Figure 5:
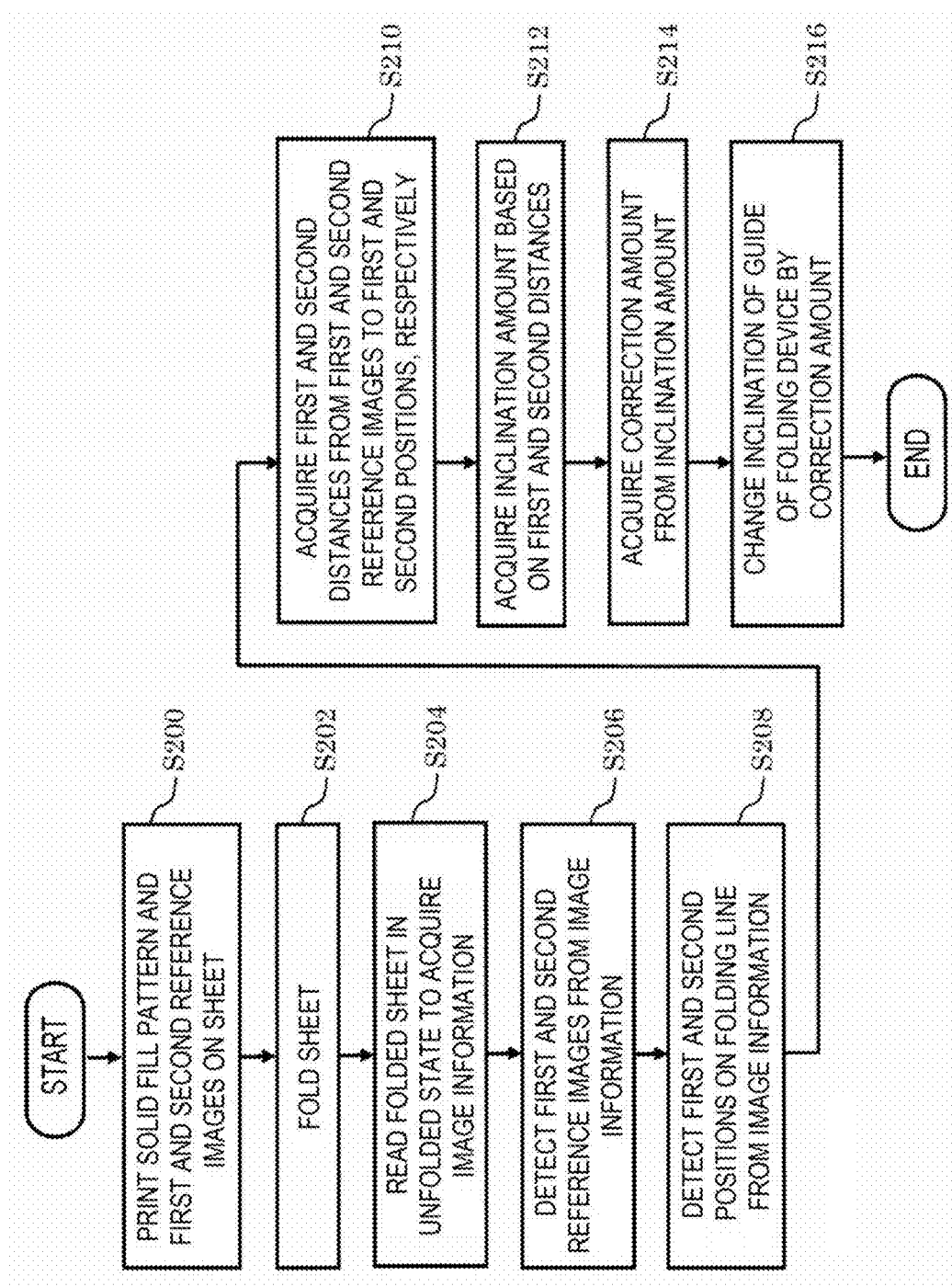
FIG. 5 is a flowchart of a process of detecting an inclination of a folding line of a sheet in a second exemplary embodiment.

FIG. 5 is a flowchart of a process of detecting an inclination of a folding line and adjusting the folding device 18 based on the detected inclination of the folding line according to the second exemplary embodiment. First, in S200 and S202, a test sheet P is prepared. This is the same as in the first exemplary embodiment, but in the second exemplary embodiment, first and second reference images are formed on the sheet P in addition to the solid fill pattern 60.

Figure 6A:
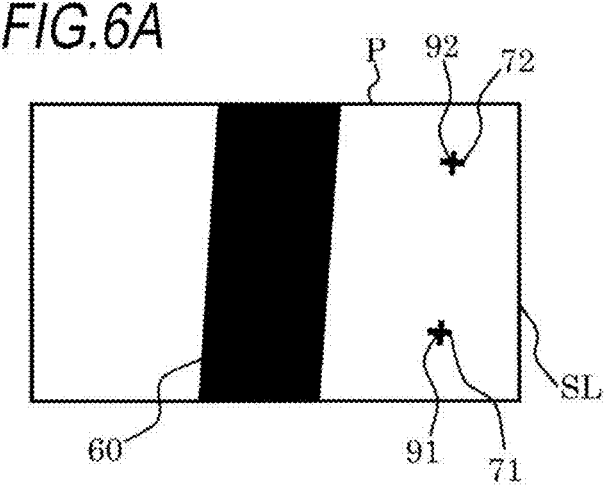
FIGS. 6A to 6C are views illustrating a process of preparing a test sheet in the second exemplary embodiment.
Figure 6B:
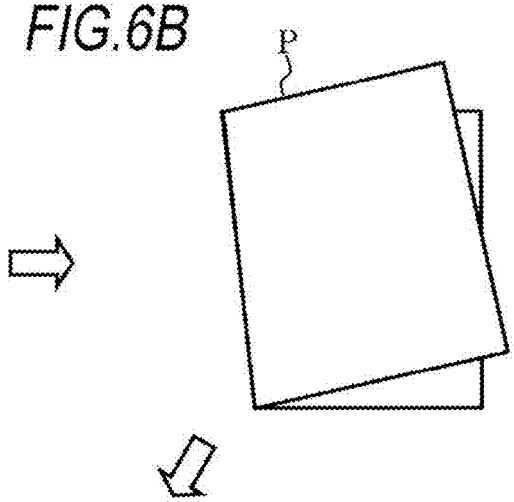
Figure 6C:
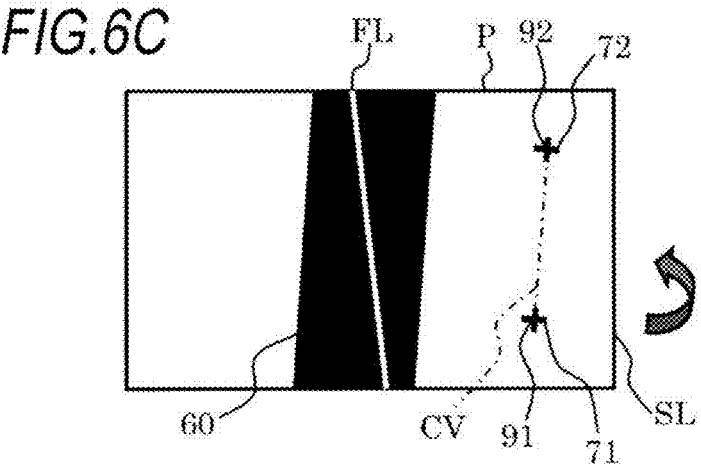

FIGS. 6A to 6C illustrate a process of preparing a test sheet P of the second exemplary embodiment. A first mark image 71 that is a cross-shaped image and a second mark image 72 that is another cross-shaped image at a position apart from the first mark image 71 are formed on the test sheet P of the second exemplary embodiment. A first reference image 91 is the center image of the first mark image 71, and a second reference image 92 is the center image of the second mark image 72. In the second exemplary embodiment, an inclination of a folding line FL with respect to a virtual connection line CV connecting the first reference image 91 and the second reference image 92 is detected.

For example, the first and second reference images 91 and 92 are images formed on the sheet P by the image forming apparatus 16 such that the virtual connection line CV formed by them is parallel to one side SL of the sheet P, but images in which the connection line CV is unintentionally formed so as to be inclined from the one side SL of the sheet P due to low accuracy of an image forming position of the image forming apparatus 16. Alternatively, for example, the first and second reference images 91 and 92 may be images formed on the sheet P by the image forming apparatus 16 such that the virtual connection line CV formed by them is intentionally inclined with respect to the one side SL of the sheet P.

Figure 8:
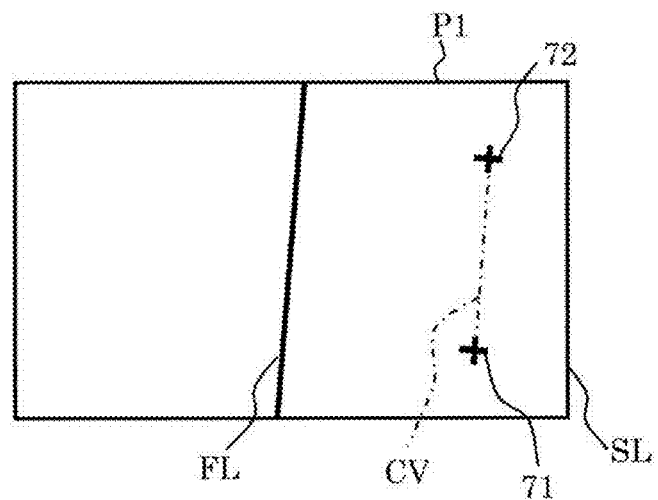
FIG. 8 is a view illustrating an example of a sheet having no inclination of a folding line with respect to virtual connection line of first and second reference images.
Figure 9:
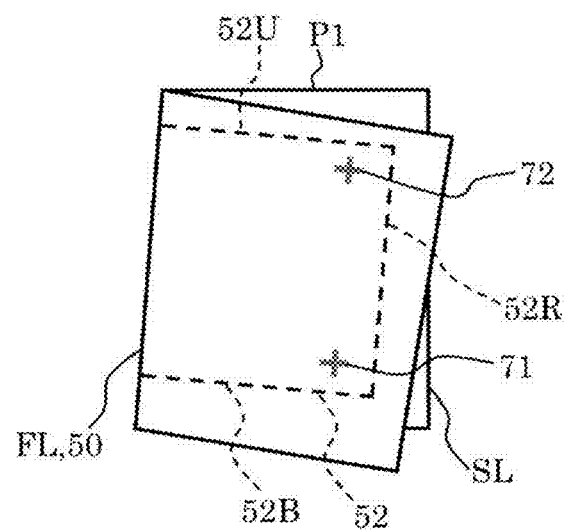
FIG. 9 is a view illustrating a cutting position of a sheet.

In the second exemplary embodiment, the inclination of the folding line FL with respect to the virtual connection line CV is detected, and the folding device 18 is adjusted such that the folding line FL is parallel to the virtual connection line CV. In this way, when another sheet P1 is folded by the adjusted folding device 18, a folding line FL of the another sheet P1 becomes parallel to the virtual connection line CV, but may not be parallel to the one side SL of the sheet, as illustrated in FIGS. 8 and 9. However, as illustrated in FIG. 9, when the sheet P is cut at positions of cutting lines 52B and 52U extending perpendicularly to the folding line FL and a cutting line 52R parallel to the folding line FL, the cut sheet is in the form of a two-folded sheet in which half-folded pieces completely overlaps, so that a desired printed matter may be obtained.

Referring back to FIG. 5, the description of the process of preparing the test sheet P will be continued. When the operator issues an adjustment start instruction through the touch panel 19, in response to the instruction, the system controller 11 issues a command to cause the image forming apparatus 16 to form the first and second mark images 71 and 72 including the first and second reference images 91 and 92, respectively, together with the solid fill pattern 60, on the sheet P (S200), and then, cause the folding device 18 to fold the sheet P (S202).

In response to a command from the system controller 11, the image forming apparatus 16 feeds a sheet P from a sheet feed tray (not illustrated) and forms the first and second mark images 71 and 72 on the sheet P together with the solid fill pattern 60 (S200). FIG. 6A illustrates an example of the sheet P formed with an image. The sheet P formed with the image is sent to the folding device 18 through a sheet transport path, and the folding device 18 half-folds the sent sheet P (S202) and then discharges the folded sheet P to an external sheet discharge tray (not illustrated). Thus, the preparation of the test sheet P is completed.

Thereafter, as in the first exemplary embodiment, the folded sheet P (the test sheet P) is unfolded and read by the image reading device 12 to obtain image information (S204). Further, as in the first exemplary embodiment, the processor 40 of the image processing apparatus 14 acquires the image information from the image reading device 12 and stores the acquired image information in the memory 42. Then, the processor 40 reads and analyzes the image information from the memory 42 to detect the inclination of the folding line FL with respect to the first and second reference images 91 and 92. S206 to S212 in FIG. 5 are a specific detection process of the second exemplary embodiment performed by the processor 40 of the image processing apparatus 14.

Figure 7:
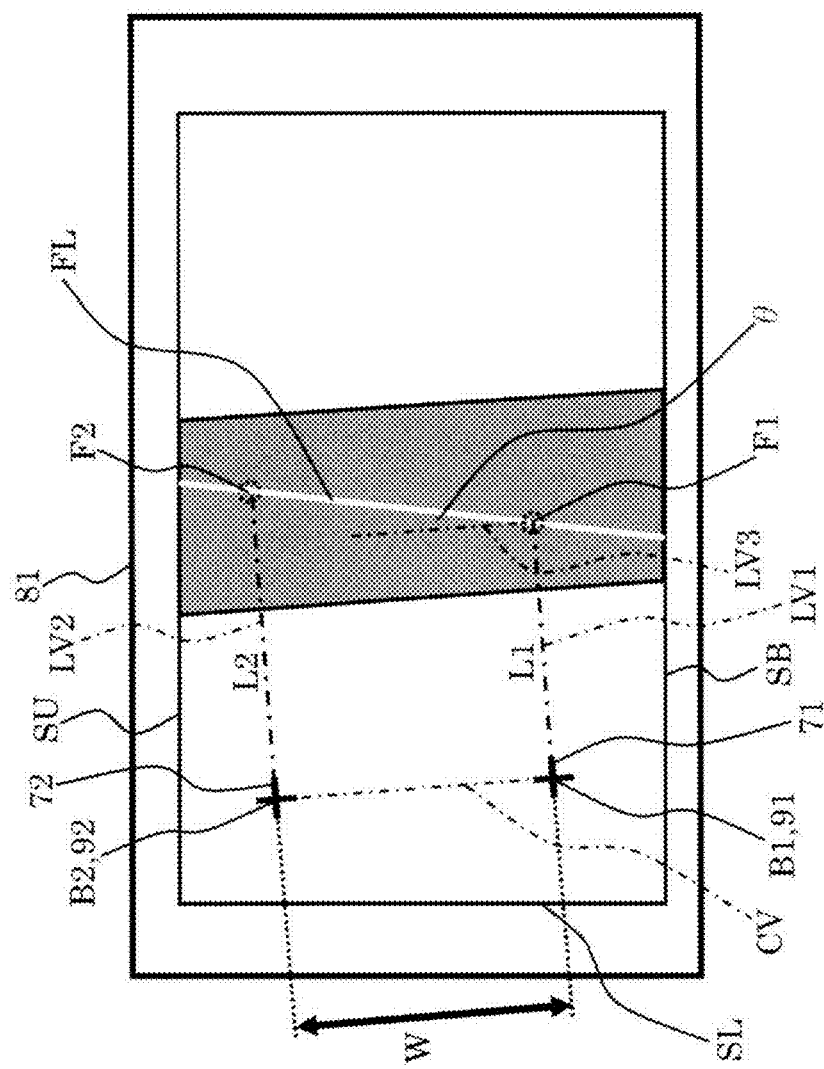
FIG. 7 is a view illustrating an example of image information in the second exemplary embodiment.

First, in S206, the processor 40 detects the first and second reference images 91 and 92 formed on the sheet P from the image information. FIG. 7 is a view illustrating image information 81 obtained by reading the sheet P illustrated in FIG. 6C with the image reading device 12. The processor 40 detects the first and second reference images 91 and 92 by searching for the first and second mark images 71 and 72 that are two characteristic cross-shaped images included in the image information 81. Here, the respective positions of the first and second reference images 91 and 92 are defined as first and second reference positions B1 and B2.

Next, in S208, the processor 40 specifies a first position F1 and a second position F2 on the folding line FL. The processor 40 specifies, as the first position F1, a position at which the folding line FL intersects a virtual line LV1 extending from the first reference position B1 in the direction perpendicular to a connection line CV. Further, the processor 40 specifies, as the second position F2, a position at which the folding line FL intersects a virtual line LV2 extending from the second reference position B2 in the direction perpendicular to the connection line CV.

Next, in S210, the processor 40 acquires a first distance L1 which is a distance from the first reference position B1 to the first position F1, and a second distance L2 which is a distance from the second reference position B2 to the second position F2.

Then, in S212, the processor 40 detects the inclination of the folding line FL with respect to the connection line CV based on the first distance L1 and the second distance L2. In FIG. 4, a virtual line LV3 parallel to the connection line CV is drawn in contact with the folding line FL. When the first distance L1 is equal to the second distance L2, the processor 40 detects that the folding line FL is not inclined with respect to the connection line CV. When the first distance L1 is smaller than the second distance L2 (case illustrated in FIG. 7), the processor 40 detects that the folding line FL is inclined clockwise with respect to the connection line CV. When the first distance L1 is larger than the second distance L2, the processor 40 detects that the folding line FL is inclined counterclockwise with respect to the connection line CV.

The processor 40 also detects an inclination amount of the folding line FL. The processor 40 further acquires a distance W between the first reference position B1 and the second reference position B2. Then, an inclination amount RG (or θ) of the folding line FL is acquired according to the equation (1) or (2). The above is the detection process of the inclination of the folding line FL of the second exemplary embodiment.

Next, in S214, the processor 40 acquires a correction amount C of the folding device 18 from the inclination amount RG (or θ) of the folding line FL. Then, in step S216, the folding device 18 acquires the correction amount C and corrects an inclination of a guide that determines a folding position of the sheet based on the correction amount C. These are the same as those in the first exemplary embodiment.

According to the second exemplary embodiment described above, since the inclination amount RG (or θ) of the folding line FL with respect to the virtual connection line CV of the first and second reference images 91 and 92 is detected and the inclination of the guide of the folding device 18 is corrected based on the correction amount C corresponding to the inclination amount, when another sheet is folded by the corrected folding device 18, a folding line FL of the another sheet may be expected to be parallel to or close parallel to the connection line CV. As illustrated in FIG. 8, a folding line FL that is parallel to or close parallel to the inclination of an image (the first and second mark images 71 and 72 in FIG. 8) formed on another sheet P1 may be obtained. In FIG. 8, the first and second mark images 71 and 72 are drawn as an example of the image formed on another sheet P1, but the image formed on the sheet naturally changes depending on the printed matter to be manufactured.

FIG. 9 is a view illustrating a state in which the sheet P1 illustrated in FIG. 8 is folded along the folding line FL. When the sheet P1 illustrated in FIG. 8 is folded, the first and second mark images 71 and 72 are hidden inside the sheet and may not be seen, but in FIG. 9, the first and second mark images 71 and 72 are represented in gray to represent the positions of the first and second mark images 71 and 72. When the sheet P is cut at the positions of the two cutting lines 52B and 52U extending perpendicular to the folding line FL and the cutting line 52R parallel to the folding line FL, a half-folded sheet in which two folded pieces completely overlaps may be obtained. Then, for example, a desired booklet or the like may be manufactured by combining plural cut sheets at the folded back 50. That is, for example, even when the image forming position of the image forming apparatus 16 is poor in accuracy and thus an image that is inclined with respect to the sheet is formed, the inclination of the folding line is adjusted according to the image, so that a desired folding result may be obtained.

In the second exemplary embodiment described above, the correction of the folding device 18 is automatically performed. Alternatively, the inclination amount of the folding line FL of the sheet P may be displayed on the touch panel 19 without performing the correction of the folding device 18. In this case as well, the operator may grasp the correction amount of the folding device 18 for obtaining the folding line FL parallel to the connection line CV. Further, the inclination of the folding line FL of the sheet P (the information about the presence or absence of the inclination and the inclination direction) may be displayed on the touch panel 19. In this case as well, the operator may grasp whether the correction of the folding device 18 is necessary in order to obtain the folding line FL based on the first and second reference images 91 and 92.

In the second exemplary embodiment described above, the connection line CV between the first and second reference images 91 and 92 is a virtual line, but it may be a line that actually exists as an image. In that case, the first and second mark images 71 and 72 may be omitted, and an image at one end of the connection line CV may be set as the first reference image 91 and an image at the other end of the connection line CV may be set as the second reference image 92.

In the first and second exemplary embodiments described above, in the image information, the inclination of the folding line FL is detected by acquiring the first and second distances that are the distances from the first and second positions F1 and F2 separated by the predetermined distance on the folding line FL of the sheet P to the first and second reference positions B1 and B2 serving as the predetermined reference of the sheet P, respectively. Here, the first and second reference positions B1 and B2 are not limited to the forms described in the first and second exemplary embodiments. For example, two notches may be provided on one side of the sheet, and the respective positions of the two notches appearing in the image information may be the first and second reference positions B1 and B2 which are set in advance. Further, for example, two punched holes may be provided in the sheet, and the respective center positions of the two punched holes appearing in the image information may be the first and second reference positions B1 and B2.

In the first and second exemplary embodiments described above, the inclination of one folding line FL of the sheet is detected, but it is also possible to detect the inclination of each of plural folding lines FL of the sheet. FIGS. 10A to 10C illustrate a Z-folded test sheet P as an example of a test sheet P having plural folding lines. FIGS. 10A to 10C illustrate a process of preparing a test sheet P corresponding to FIGS. 3A to 3C. Since a sheet P as illustrated in FIGS. 10A to 10C includes plural folding lines FL1 and FL2, when the sheet P is read by the image reading device 12, a folding line appearing on the left side (or right side) of image information may be either FL1 or FL2 depending on how the sheet P is placed on the platen glass 30 of the image reading device 12. For example, when the sheet P of FIG. 10C is turned over to be swapped between up and down, and is placed on the platen glass 30 to read the sheet P, a folding line FL2 appears on the left side of the image information. Meanwhile, when the sheet P of FIG. 10C is turned over to be swapped between left and right, and is placed on the platen glass 30 to read the sheet P, a folding line FL1 appears on the left side of the image information. Therefore, the image processing apparatus 14 may not individually specify the folding lines FL1 and FL2 in the image information.

Therefore, as illustrated in FIGS. 10A and 10C, a guide mark image 98 may be formed on the sheet P. The guide mark image 98 is information that guides the direction of the sheet P when being read by the image reading device 12. As illustrated in FIGS. 10A and 10C, for example, the guide mark image 98 is an image such as a circle mark formed on a corner of the sheet P. Then, for example, as a guide screen, the touch panel 19 displays that the sheet P should be turned upside down and placed on the platen glass 30 such that the guide mark image 98 of the sheet P is on the left side (or right side) of the platen glass 30. As a result, when the sheet P is read by the image reading device 12, the sheet P is placed on the platen glass 30 in a certain orientation, so that the folding line FL1 always appears on the left side (or right side) of the image information. Therefore, the image processing apparatus 14 may individually specify the folding lines FL1 and FL2 in the image information.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In addition, the operation of the processor in each of the above-described exemplary embodiments may be performed not only by one processor but also by plural processors existing at physically separated positions in cooperation. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
    acquire image information obtained by reading a folded sheet with an image reading device in a state where the folded sheet is unfolded;
    acquire first and second distances in the image information, the first and second distances being distances from first and second positions to a predetermined reference of the sheet, respectively, the first and second positions on a folding line of the sheet being separated by a predetermined distance; and
    detect an inclination of the folding line of the sheet based on the first and second distances.

2. The image processing apparatus according to claim 1, wherein
the predetermined reference is first and second reference positions on a first side of the sheet, and
the processor is configured to:
    acquire the first and second distances in the image information, the first and second distances being distances from the first and second positions to the first and second reference positions, respectively; and
    detect the inclination of the folding line with respect to the first side of the sheet based on the first and second distances.

3. The image processing apparatus according to claim 2, wherein
the first and second positions are located on second and third sides of the sheet, respectively, the second and third sides being opposite to each other,
the first and second reference positions are located at first and second ends of the first side, respectively,
a distance from the first position to the first reference position located on the second side which is closer to the first position than the third side is the first distance, and
a distance from the second position to the second reference position located on the third side which is closer to the second position than the second side is the second distance.

4. The image processing apparatus according to claim 3, wherein the sheet includes a solid fill pattern at a folded position.

5. The image processing apparatus according to claim 3, wherein the sheet includes information for guiding an orientation of the sheet when the sheet is read by the image reading device.

6. The image processing apparatus according to claim 2, wherein the sheet includes a solid fill pattern at a folded position.

7. The image processing apparatus according to claim 6, wherein the sheet includes information for guiding an orientation of the sheet when the sheet is read by the image reading device.

8. The image processing apparatus according to claim 2, wherein the sheet includes information for guiding an orientation of the sheet when the sheet is read by the image reading device.

9. The image processing apparatus according to claim 1, wherein
the predetermined reference is first and second reference images formed on the sheet, and
the processor is configured to:
    acquire the first and second distances in the image information, the first and second distances being distances from the first and second positions to the first and second reference images, respectively; and
    detect the inclination of the folding line with respect to the first and second reference images based on the first and second distances.

10. The image processing apparatus according to claim 2, wherein
a position where the folding line intersects a virtual line extending from the first reference position on the first side of the sheet in a direction perpendicular to the first side is the first position,
a position where the folding line intersects a virtual line extending from the second reference position on the first side of the sheet in the direction perpendicular to the first side is the second position, and
the processor is configured to detect an inclination amount of the folding line with respect to the first side of the sheet based on a distance between the first and second reference positions.

11. The image processing apparatus according to claim 9, wherein
the first and second reference images are formed with a gap between the first and second reference images, and
the processor is configured to detect the inclination of the folding line with respect to a virtual or existing connection line connecting the first and second reference images.

12. The image processing apparatus according to claim 11, wherein the sheet includes a solid fill pattern at a folded position.

13. The image processing apparatus according to claim 11, wherein the sheet includes information for guiding an orientation of the sheet when the sheet is read by the image reading device.

14. The image processing apparatus according to claim 11, wherein
a position where the folding line intersects a virtual line extending from the first reference image in a direction perpendicular to the connection line is the first position, a position where the folding line intersects a virtual line extending from the second reference image in the direction perpendicular to the connection line is the second position, and the processor is configured to detect an inclination amount of the folding line with respect to the connection line based on a distance between the first and second reference images.

15. The image processing apparatus according to claim 9, wherein the sheet includes a solid fill pattern at a folded position.

16. The image processing apparatus according to claim 9, wherein the sheet includes information for guiding an orientation of the sheet when the sheet is read by the image reading device.

17. The image processing apparatus according to claim 1, wherein the sheet includes a solid fill pattern at a folded position.

18. The image processing apparatus according to claim 17, wherein the sheet includes information for guiding an orientation of the sheet when the sheet is read by the image reading device.

19. The image processing apparatus according to claim 1, wherein the sheet includes information for guiding an orientation of the sheet when the sheet is read by the image reading device.

20. A folding device that forms a folding line on another sheet based on the inclination of the folding line detected by the image processing apparatus according to claim 1 such that an extending direction of the folding line of the another sheet changes when folding the another sheet.

\* \* \* \* \*